United States Patent
Francis et al.

(10) Patent No.: US 10,632,716 B2
(45) Date of Patent: Apr. 28, 2020

(54) COMPOSITE PANELS

(71) Applicant: Gurit (UK) Ltd., Newport, Isle of Wight (GB)

(72) Inventors: Harvey Francis, Merstone (GB); Daniel Thomas Jones, Cowes (GB)

(73) Assignee: Gurit (UK) Ltd., Newport, Isle of Wight, Hampshire (GB)

( * ) Notice: Subject to any disclaimer, the term of this patent is extended or adjusted under 35 U.S.C. 154(b) by 0 days.

(21) Appl. No.: 15/830,297

(22) Filed: Dec. 4, 2017

(65) Prior Publication Data
US 2018/0154606 A1    Jun. 7, 2018

(30) Foreign Application Priority Data

Dec. 5, 2016 (GB) .................................. 1620666.6

(51) Int. Cl.
*B32B 5/02* (2006.01)
*B32B 27/20* (2006.01)
(Continued)

(52) U.S. Cl.
CPC ............... *B32B 5/024* (2013.01); *B32B 5/02* (2013.01); *B32B 5/022* (2013.01); *B32B 27/12* (2013.01); *B32B 27/20* (2013.01); *B29C 70/345* (2013.01); *B32B 5/08* (2013.01); *B32B 5/26* (2013.01); *B32B 27/08* (2013.01); *B32B 27/306* (2013.01); *B32B 27/308* (2013.01); *B32B 27/36* (2013.01);
(Continued)

(58) Field of Classification Search
CPC ................................ B32B 5/024; B32B 5/022

USPC ........................................................ 428/220
See application file for complete search history.

(56) References Cited

U.S. PATENT DOCUMENTS

2009/0011210 A1* 1/2009 Gao ...................... B29C 70/504
                                                              428/220
2009/0298374 A1* 12/2009 Delmas .................... B32B 7/08
                                                              442/374
(Continued)

FOREIGN PATENT DOCUMENTS

CN     104629350 A      5/2015
EP     3085515 A1      10/2016
(Continued)

OTHER PUBLICATIONS

Combined Search and Examination Report under Sections 17 and 18(3) dated May 31, 2017 in priority application GB1620666.6.
(Continued)

*Primary Examiner* — Tahseen Khan
(74) *Attorney, Agent, or Firm* — Polsinelli, PC

(57) ABSTRACT

A composite panel including a multilayer laminate with a plurality of central plies of fibre reinforced resin matrix composite material, wherein at least one of the central plies includes a first fibrous layer of a plurality of non-woven carbon fibres which are substantially randomly oriented, and a rear reinforcement layer which is integrally moulded with the central multilayer portion the reinforcement layer being comprised of a rear ply of fibre reinforced resin matrix composite material, wherein the rear ply includes a second fibrous layer of a plurality of continuous fibres which extend continuously from at least one portion of a first edge of the rear ply to at least one portion of an opposite second edge of the rear ply.

40 Claims, 3 Drawing Sheets

(51) Int. Cl.
   *B32B 27/12* (2006.01)
   *B32B 27/38* (2006.01)
   *B32B 27/08* (2006.01)
   *B32B 27/42* (2006.01)
   *B32B 27/30* (2006.01)
   *B32B 5/08* (2006.01)
   *B32B 5/26* (2006.01)
   *B32B 27/36* (2006.01)
   *B29C 70/34* (2006.01)

(52) U.S. Cl.
   CPC .............. *B32B 27/38* (2013.01); *B32B 27/42* (2013.01); *B32B 2250/05* (2013.01); *B32B 2260/023* (2013.01); *B32B 2262/02* (2013.01); *B32B 2262/101* (2013.01); *B32B 2262/106* (2013.01); *B32B 2264/10* (2013.01); *B32B 2264/102* (2013.01); *B32B 2264/104* (2013.01); *B32B 2264/12* (2013.01); *B32B 2307/40* (2013.01); *B32B 2307/516* (2013.01); *B32B 2307/518* (2013.01); *B32B 2307/52* (2013.01); *B32B 2307/538* (2013.01); *B32B 2307/558* (2013.01); *B32B 2307/718* (2013.01); *B32B 2307/734* (2013.01); *B32B 2307/75* (2013.01); *B32B 2309/105* (2013.01); *B32B 2471/00* (2013.01); *B32B 2605/00* (2013.01); *B32B 2605/003* (2013.01); *B32B 2605/08* (2013.01); *B32B 2605/10* (2013.01); *B32B 2605/18* (2013.01)

(56) References Cited

U.S. PATENT DOCUMENTS

| 2010/0078254 | A1* | 4/2010 | Rolfe | B60L 8/003 180/302 |
|---|---|---|---|---|
| 2015/0115505 | A1* | 4/2015 | Jones | B29C 70/345 264/511 |
| 2016/0193793 | A1* | 7/2016 | Filippini | B32B 5/26 428/71 |

FOREIGN PATENT DOCUMENTS

| GB | 2536255 A | * | 9/2016 | ............. B29C 70/48 |
| GB | 2536255 A | | 9/2016 | |
| WO | 2016/142479 A1 | | 9/2016 | |
| WO | 2017/140911 A1 | | 8/2017 | |

OTHER PUBLICATIONS

Extended European Search Report dated Feb. 2, 2018 in EP17205188.0.

* cited by examiner

COMPOSITE PANELS

FIELD OF THE INVENTION

The present invention relates to a composite panel composed of a fibre reinforced resin matrix composite material. In particular, the composite panel of the present invention enables the manufacture of various components, in particular for vehicles, such as automobiles, aircraft, or railway locomotives and carriages, for example body panels, such as automotive body panels or body panels for other vehicles, floor pans, pillars, seats, interior panels, structural components, etc. comprising fibre reinforced resin matrix composite materials.

BACKGROUND

In the field of automotive body panels, a significant weight saving can be achieved by replacing current metallic automotive body panels with composite materials. With lower cost tooling, significant savings can be made in lower volume production runs.

High performance body panel parts are required to have the combination of lightness and strength, in particular stiffness. The panel member may have a low weight and high stiffness but may require further properties such as impact resistance and resistance to deformation, such as warping, as result of being subjected to elevated temperatures or temperature changes, and mechanical deformation. The panel member may also be required to have a high quality smooth surface, known in the art as an A-class finish, on at least one major surface, for example a front surface of an automotive body panel, which is ready for painting to provide a high quality painted surface.

SUMMARY OF THE INVENTION

It is accordingly an aim of this invention to provide a composite panel which can be manufactured at a lower cost and can have a combination of low weight, high stiffness, high impact resistance, low resistance to warping and a high quality surface finish, typically an A-class finish, on at least one major surface.

It is also an aim of this invention to provide a composite panel which provides the combination of low weight, high stiffness, high impact resistance, low resistance to warping and a high quality surface finish, typically an A-class finish, on at least one major surface, but in lower weight panels than known and current commercial composite panels providing similar properties.

It is known to use carbon fibre layers to form the outer surface of a vehicle body panel. When the carbon fibres in the layer are randomly oriented, there is less fibre pattern which may print through to the outer surface of the vehicle body panel, which can improve the surface smoothness. However, commercially available carbon fibre layers in which the carbon fibres are randomly oriented typically include needle holes which can result in the formation of resin rich areas within the cured resin matrix of the resultant composite material. Such resin rich areas can cause visible defects in the outer surface of a vehicle body panel.

WO-A-2016/142479 discloses a prepreg for the manufacture of fibre reinforced resin matrix composite materials having good surface finish. The prepreg comprises a surface film comprising a thermosetting resin and a particulate filler material dispersed therein, and a fibrous layer on which the surface film is disposed, the fibrous layer comprising a plurality of non-woven carbon fibres which are substantially randomly oriented, wherein the fibrous layer has interstices between the carbon fibres dimensioned for absorbing at least a portion of the thermosetting resin during a resin infusion step and filtering at least a portion of the particulate filler material in the surface film to remain in the surface film during the resin infusion step. However, a composite panel moulded from such a prepreg has low impact resistance.

There is still a need to provide a composite panel which has the combination of low weight, a good surface finish and high stiffness, together with good impact resistance.

In this specification the term "substantially randomly orientated" meant that regular repeating fibre angles are not present, in contrast to the case of a unidirectional, woven, or multiaxial fabric.

In the preferred embodiments of the composite panel of the present invention, a front surface of the composite panel is provided by a front surface of the front layer of panel, with the rear reinforcement layer being located on an opposite rear surface of the panel. Preferably, the front surface of the composite panel may be ready for painting to an A-surface finish. In this specification, the term "A-surface" means the final intended visible cosmetic surface, for example the exterior surface of a vehicle body panel. The opposite side is the B-surface, which is the surface usually hidden from view or the surface viewed as not having the same cosmetic finish standard if both surfaces are to be seen.

The central multilayer portion has a non-woven carbon fibrous layer in which the carbon fibres are randomly oriented. The front layer, comprising a surfacing resin film including filler particles, is adjacent to the non-woven carbon fibrous layer. These non-woven, randomly oriented carbon fibres, which are discontinuous, provide low print through of any fibre pattern into the front surface of the panel, so that the visible front surface is a highly smooth and uniform surface. The central multilayer portion provides low panel areal weight, good paintability and high quality surface finish, e.g. an A-surface finish, particularly as a result of being covered by, as the front layer, a surfacing film which comprises resin with particulate filler, for example inorganic filler particles and/or milled carbon fibres and/or milled glass fibres, and low warping of the panel when subjected to thermal treatment. The filler material in the front surfacing layer is a filler that reduces the coefficient of thermal expansion of the surfacing resin layer. However, the central multilayer portion provides poor impact resistance. This is because the non-woven, randomly oriented carbon fibres, which are discontinuous, provide low tolerance to impact stresses.

The present invention is predicated on the finding by the present inventors that the addition of a rear reinforcement layer, which in contrast to the discontinuous non-woven, randomly oriented carbon fibres, comprises continuous fibres which typically have higher strain than the carbon fibres, and are typically are woven or otherwise aligned, can provide increased impact strength to the composite panel without compromising the properties of the central multiplayer portion coated with the front layer filled surfacing film. In other words, the addition of the rear reinforcement layer increases the impact strength of the composite panel without significantly (i) increasing the panel areal weight, (ii) reducing the paintability or quality of the surface finish, e.g. so that an A-surface finish can still be achieved, or (iii) increasing the warping of the panel when subjected to thermal stresses.

The structural requirements of the composite panel are increased, by increasing the impact strength, without increasing the areal weight or cost of the panel. Also, the surface finish is not significantly reduced in quality.

The present invention can provide a composite panel that has a lower areal weight that current carbon fibre composite panels, for example for use as vehicle body panels, but which nevertheless still has the required properties of good paintability, high quality surface finish, low warping of the panel, and good impact resistance.

This provision of the rear reinforcement layer of continuous fibres in the composite panel can provide the combination of sufficient reinforcement without excessive addition of weight, while being able to provide an integral moulding of the central multilayer portion of the panel, which employs fibrous layers of a plurality of discontinuous non-woven carbon fibres which are substantially randomly oriented, and a reinforcement portion in the form of the rear reinforcement layer. The rear reinforcement layer can add very little weight or thickness yet can greatly enhance the impact resistance. Accordingly, lighter and low cost reinforced carbon fibre laminates can be manufactured.

The rear reinforcement layer comprises continuous fibrous material in which the fibres optionally have a greater strain than the carbon fibres in the central multilayer portion. The fibrous material comprises aligned fibres, typically aligned bundles of fibres, for example in the form of a woven fabric. The rear reinforcement layer is on the rear face of the composite panel, which reduces the possibility of print though of the aligned fibres at the visible front surface.

The provision of the rear reinforcement layer of continuous fibres, for example woven, fibres that are not carbon fibres, for example glass fibres, may provide a structural asymmetry to the layers of the composite panel which may cause the composite panel to warp or distort when subjected to thermally induced stresses. This problem may be enhanced when the continuous fibres have a heavy areal weight. This warping or distortion may result from the layers of the composite panel having different coefficients of thermal expansion so that if the layer structure is asymmetric about a central neutral plane extending through the panel, differential expansion or contraction of the panel on the opposite sides of the neutral plane can cause warping or distortion of the composite panel.

In some embodiments of the present invention, the surfacing film on the front face and the rear reinforcement layer on the rear face are on opposite sides of a symmetric central multilayer laminate, and the surfacing film and the rear reinforcement layer are structured to provide a panel that has balanced coefficients of thermal expansion on opposite sides of the neutral plane.

For example, in some embodiments the filled resin surfacing film on the front face may be thermally balanced by the rear reinforcement layer including continuous fibres, for example a lightweight woven glass fibre layer, in a filled resin film that has a lower areal weight of filled resin than in the surfacing film.

Alternatively, in some embodiments the filled resin surfacing film on the front face may be thermally balanced by both the surfacing film and the rear reinforcement layer including continuous fibres, for example a lightweight woven glass fibre layer, in a filled resin film, with equal areal weights of resin and filler in the surfacing film and the rear reinforcement layer. However, in these embodiments there is a possibility of print through from the continuous fibre in the front layer, which is minimised by selecting a lightweight woven glass fibre fabric.

The symmetry provides that the neutral axes, with respect to the mechanical properties, of the moulded composite panel are substantially located at the dimensional centre of the composite panel. The practical technical effect is that the composite panel has a high resistance against warping as a result of temperature or mechanical load variations because the neutral axis is centrally located. This provides a highly thermally and mechanically stable panel structure using non-woven carbon fibres which are substantially randomly oriented to provide, in the preferred embodiments, the majority by weight of the structural fibres in the composite panel.

The use of continuous fibres in the form of a lightweight woven glass fabric to increase the impact resistance of a carbon fibre panel, as opposed to using a woven carbon fibre layer, reduces the additional cost of providing effective impact resistance to the carbon fibre panel. The use of continuous fibres in the form of a lightweight woven glass fabric to increase the impact resistance of a carbon fibre panel, as opposed to using a woven carbon fibre layer, also reduces the risk of print though of any fibre pattern to the front surface of the carbon fibre panel. In the preferred embodiments of the present invention, the combination of the carbon and continuous fibres provides the desired structural and aesthetic properties, in particular impact resistance and high quality surface finish, without introducing warping or distortion problems and without significantly increasing the areal weight or cost of the panel.

In some embodiments of the present invention, a woven or multiaxial carbon fibre layer, which also includes continuous fibres, may be provided to improve the in-plane mechanical properties of the composite panel, for example to increase the panel stiffness. In these embodiments, the woven or multiaxial carbon fibre layer is located at the central neutral plane and is sandwiched between opposed fibrous layers of a plurality of non-woven carbon fibres which are substantially randomly oriented. This laminate structure reduces the possibility of print though of the woven or multiaxial fibres at the visible front surface. The location of the woven or multiaxial carbon fibre layer preferably provides a structural symmetry to the layers of the composite panel about the central neutral plane which avoids or minimises warping or distortion of the composite panel when subjected to thermally induced stresses.

The present invention enables the manufacture of various components, in particular for vehicles, such as automobiles, aircraft, or railway locomotives and carriages, for example body panels, such as automotive body panels or body panels for other vehicles, floor pans, pillars, seats, interior panels, structural components, etc. comprising fibre reinforced resin matrix composite materials.

The present invention further provides a vehicle component, in particular a body panel, comprising the composite panel of the present invention. In preferred embodiments of the present invention, the vehicle body panel has excellent surface finish, stiffness, impact strength and strength to weight ratios, and may be ready for painting to an A-surface finish.

BRIEF DESCRIPTION OF THE DRAWINGS

Embodiments of the present invention will now be described by way of example, with reference to the accompanying drawings, in which.

DETAILED DESCRIPTION

Figure 1:
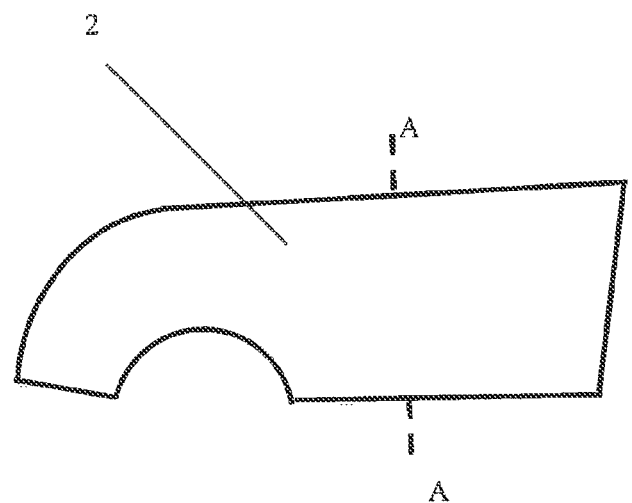
FIG. 1 schematically illustrates a side view of a front surface of a vehicle body panel according to an embodiment of the present invention.
Figure 2:
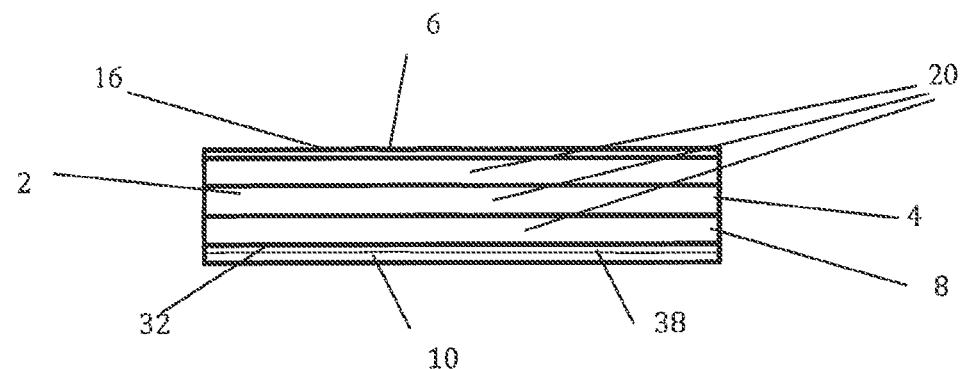
FIG. 2 schematically illustrates an enlarged cross-section on line A-A through a part of the vehicle body panel of FIG. 1.

Referring to FIGS. 1 and 2, there is shown in schematic form a composite panel 2 composed of a fibre reinforced resin matrix composite material. In this embodiment, the composite panel 2 is a vehicle body panel, for example an automobile front wing 20. FIG. 1 is a side view and FIG. 2 is a cross-sectional view on line A-A with the thicknesses greatly exaggerated, and not to scale, for clarity of illustration.

The composite panel 2 comprises a multilayer laminate 4 including a front layer 6, a central multilayer portion 8 and a rear reinforcement layer 10.

Figure 3:
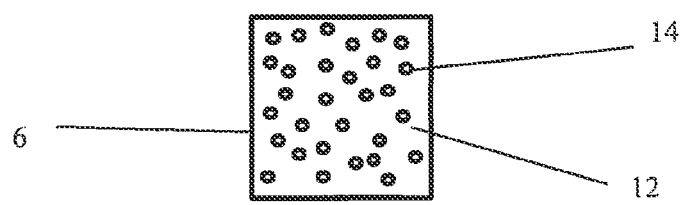
FIGS. 3, 4 and 5 are enlarged views of, respectively, the front layer, the central ply of the central multilayer portion and the rear reinforcement layer of the vehicle body panel of FIG. 1.

Referring also to FIG. 3 which is greatly exaggerated, and not to scale, for the sake of clarity of illustration, the front layer 6, which is a surface film, comprises a resin 12 and a filler material 14 dispersed therein. The front layer 6 forms an A-surface for the panel 2.

The filler material in the front layer 6 is a filler that reduces the coefficient of thermal expansion of the resin layer. For example, the filler material may comprise inorganic fillers such as talc, calcium carbonate, silica, aluminosilicate ash, chalk, clay minerals, marble dust, slate powder or silicon carbide. Alternatively, the filler may contain milled fibres such as milled carbon fibres and/or milled glass fibres. Optionally, the filler may comprise or consist of talc, for example Magil Star 350# talc. The filler material may have an average particle size of from 5 to 100 microns. Optionally, the average particle size of the filler material is from 8 to 30 microns, for example about 12 microns. Typically, at least 98 wt % of the particulate filler material passes through a 45 micron sieve. Optionally, the filler material has a particle size distribution of 99 wt % less than 75 microns, 84 wt % less than 30 microns, 68 wt % less than 20 microns and 48 wt % less than 10 microns.

The front layer 6 typically comprises from 55 to 85 wt % of resin 12 and from 15 to 45 wt % of filler material 14, each wt % based on the total weight of the front layer 6. The resin 12 forms a resin matrix in which the filler material 14 is dispersed. The resin 12 is typically a thermoset resin. The thermoset resin, may comprise an epoxy, vinyl ester, polyester, acrylic, cyanate ester, phenolic, furan, or benzoxazine resin. Typically, the thermoset resin comprises an epoxy resin. The front layer 6 defines at least a part of a front surface 16 of the composite panel 2. The front layer 6 extends over from 50 to 100%, typically from 90 to 100%, for example 100%, of the front surface 16 of the panel 2.

The front layer 6 typically has a total weight of filled resin from 150 to 450 gsm (grams per square metre), optionally from 150 to 350 gsm, further optionally from 200 to 300 gsm.

Figure 4:
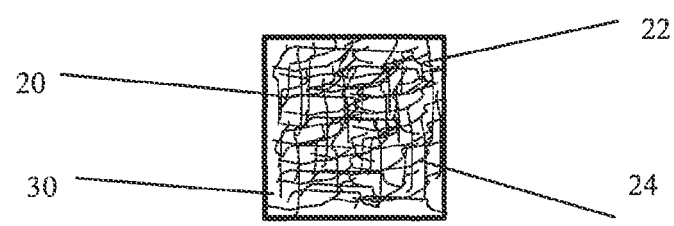

The central multilayer portion 8 comprises a plurality of central plies 20 of fibre reinforced resin matrix composite material. Referring also to FIG. 4 which is greatly exaggerated, and not to scale, for the sake of clarity of illustration, at least one of the central plies 20 includes a first fibrous layer 22 of a plurality of non-woven carbon fibres 24 which are substantially randomly oriented, called herein a random fibrous layer. The front layer 6 is adjacent to the first fibrous layer 22.

The non-woven, randomly-oriented carbon fibres 24 are discontinuous. They do not extend continuously from at least one portion of a first edge of the respective central ply 20 to at least one portion of an opposite second edge of the central ply 20. The discontinuous fibres are not mutually aligned and form a disordered configuration, and do not extend in a common direction; the discontinuous fibres are randomly arranged. The ends of the discontinuous fibres are located at random positions in the first fibrous layer 22 and are not universally located in a regular manner at edges of the first fibrous layer 22, although some ends may be randomly located at the edges as a result of cutting of the first fibrous layer 22 to a desired shape and dimensions. The discontinuous fibres are typically between 1 and 300 mm in length. The discontinuous fibres can be present in the form of bundles with multiple filaments, as is employed in the exemplified non-woven recycled carbon fibre material, or in bundles such as in a chopped tow configuration, but when such bundles or chopped tows are present the bundles or tows themselves are randomly oriented although in any give bundle or tow the multiple filaments are aligned. Consequently, the description of discontinuous fibres which are non-woven, randomly-oriented carbon fibres 24 means that the individual fibres, bundles or tows are randomly-oriented.

In some embodiments, there are plural central plies 20 which each preferably comprise a common fibrous layer which is present in each of the central plies 20. In this specification a "common" fibrous layer means that the same fibrous material has been made to make the respective layers.

Each random fibrous layer 22 comprises a plurality of non-woven carbon fibres, which are substantially randomly orientated. The random fibrous layer 22 has interstices between the carbon fibres which have absorbed thermosetting resin during a resin infusion step. The non-woven carbon fibres may be chopped and/or cut and/or broken fibres. Thus, the random fibrous layer 22 may comprise chopped and/or cut and/or broken fibres. Such chopped and/or cut and/or broken carbon fibres may have a length of less than 250 mm Optionally, at least 50 wt % of the fibres have a length of from 3 to 150 mm, optionally from 3 to 50 mm and further optionally from 3 to 30 mm.

In the illustrated embodiment there are three central plies 20, each including a respective first fibrous layer 20. Typically, the central multilayer portion 8 comprises from 300 to 1000 gsm, more typically from 350 to 650 gsm, for example from 350 to 450 gsm, of non-woven carbon fibres which are substantially randomly oriented. In this embodiment, the carbon fibres in the central multilayer portion 8 consist of non-woven fibres with a fabric weight of from 300 to 650 gsm.

Each ply 20 in the central multilayer portion 8 comprises fibres in a resin matrix 30. The resin matrix 30 typically comprises a thermoset resin. The thermoset resin, may comprise an epoxy, vinyl ester, polyester, acrylic, cyanate ester, phenolic, furan, or benzoxazine resin. Typically, the thermoset resin comprises an epoxy resin.

The rear reinforcement layer 10 is integrally moulded with the central multilayer portion 8 and is located at a rear surface 32, opposite to the front layer 6, of the multilayer laminate 4.

Figure 5:
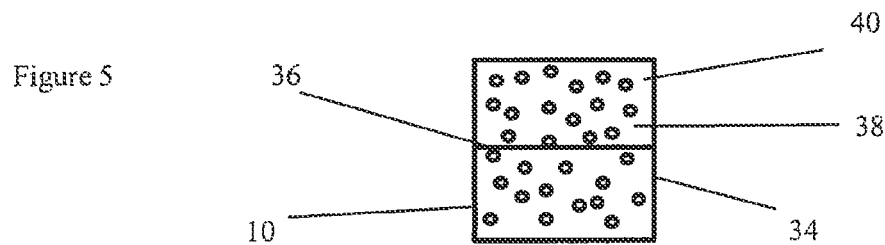

Referring also to FIG. 5 which is greatly exaggerated, and not to scale, for the sake of clarity of illustration, the reinforcement layer 10 is comprised of a rear ply 34 of fibre reinforced resin matrix composite material. The rear ply 34 includes a second fibrous layer 36 of a plurality of continuous fibres in a resin matrix 38. The resin matrix 38 typically comprises a thermoset resin. The thermoset resin, may comprise an epoxy, vinyl ester, polyester, acrylic, cyanate ester, phenolic, furan, or benzoxazine resin. Typically, the thermoset resin comprises an epoxy resin.

Figure 6:
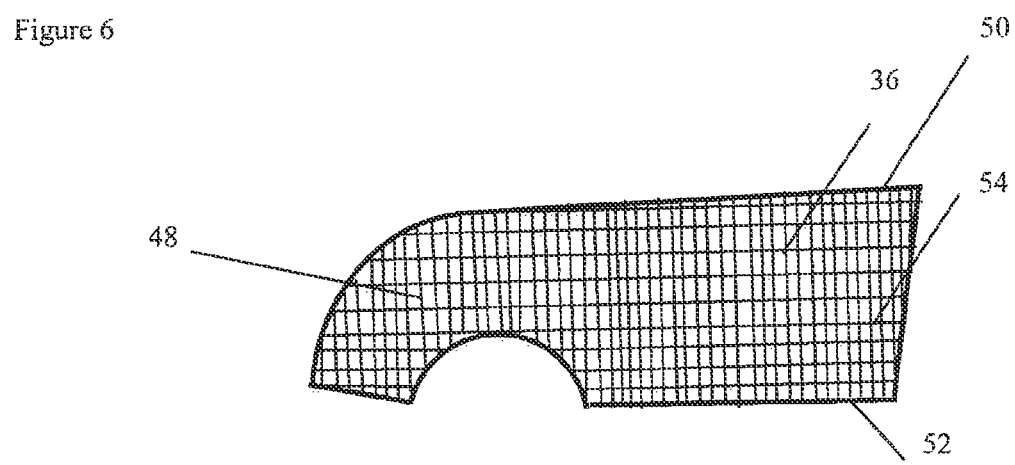
FIG. 6 is an enlarged plan view of the rear reinforcement layer of the vehicle body panel of FIG. 1.

As shown in FIG. 6, which is greatly exaggerated, and not to scale, for the sake of clarity of illustration, the second fibrous layer 36 is composed of a plurality of continuous fibres 48. The continuous fibres 48 extend continuously from at least one portion of a first edge 50 of the rear ply 34 to at least one portion of an opposite second edge 52 of the rear ply 34. The ends of the continuous fibres 48 are located at edges of the second fibrous layer 36.

The continuous fibres are mutually aligned and form an ordered configuration, extending in a common linear direction; the continuous fibres are non-randomly arranged, in contrast to the randomly-arranged discontinuous fibres of the central multilayer portion 8. The fibres are typically in aligned bundles, known in the art as tows, each tow typically comprising 2,000 to 60,000 individual fibre filaments. The tows are aligned, for example in fabric that may be a woven fabric or a uniaxial, biaxial, triaxial or other multiaxial fabric known to those skilled in the art.

In this embodiment the second fibrous layer 36 is woven and is additionally composed of a plurality of further continuous fibres 54 woven orthogonally to the continuous fibres 48. Any woven configuration, known for use with structural fibres in composite materials, may be employed for the second fibrous layer 36. For example, the woven material may be a twill, plain weave, satin weave (e.g. eight-harness-satin weave), etc. Alternatively, the second fibrous layer 36 may be a non-woven material that is continuous, in particular a unidirectional (UD) material or a multiaxial material, for example layers of aligned tows stitched together to form a biaxial fabric having structural fibres in two directions, typically two orthogonal directions, or any other multiple layer configuration.

Any orientation of the continuous fibres 48, 54 relative to the shape and dimensions of the panel 2 may be employed. For example, the continuous fibres 48, 54 may be oriented relative to one or more edges of the panel 2 or two one or more axes of the panel 2; alternatively there may be no relationship between the orientation of the continuous fibres 48, 54 and the shape and dimensions and mechanical properties of the panel 2.

The rear ply 34 of the rear reinforcement layer 10 may be coextensive with the central multilayer portion 8 and/or the front layer 6 of the multilayer laminate 4. Alternatively, the rear ply 34 of the rear reinforcement layer 10 may have different in-plane dimensions than the central multilayer portion 8 and/or the front layer 6 and so is not coextensive with the central multilayer portion 8 and/or the front layer 6 of the multilayer laminate 4. For example, the rear ply 34 of the rear reinforcement layer 10 may be smaller in dimension, at least in a one direction, than the central multilayer portion 8, for example when only a portion of the central multilayer portion 8 requires the additional properties provided by the rear reinforcement layer 10.

The continuous fibres of the second fibrous layer 36 typically have a lower Young's modulus and higher strain, typically greater than 1.5%, than the non-woven carbon fibres of the first fibrous layer 20. Typically, the continuous fibres of the second fibrous layer 36 are composed of glass fibres, thermoplastic fibres or aramid fibres. Preferably, the woven fibres of the second fibrous layer 36 are composed of glass fibres, for example E-glass fibres, typically a plain weave of E-glass fibres. Therefore the continuous fibres of the second fibrous layer 36 typically have a greater strain, under an applied stress, than the discontinuous non-woven carbon fibres of the first fibrous layer 20.

Typically, the continuous fibres of the second fibrous layer 36 have a fabric weight of from 50 to 300 gsm, typically from 50 to 200 gsm, for example from 50 to 100 gsm. The front layer 6 typically has a higher weight per unit area of inorganic particulate filler material than the rear reinforcement layer 10.

The rear ply 34 further comprises a filler material 40, similar to or the same as the filler material 14 in the front layer 6. Typically, the rear ply 34 comprises from 10 to 40 wt % of continuous fibres, and from 60 to 90 wt % of a filled resin system, each wt % based on the total weight of the rear ply, the filled resin system comprising from 55 to 85 wt % of resin, and from 15 to 45 wt % of filler material, each wt % based on the total weight of the filled resin system. For example, the rear ply 34 comprises from 15 to 35 wt % of continuous fibres, and from 65 to 85 wt % of a filled resin system, each wt % based on the total weight of the rear ply, the filled resin system comprising from 55 to 85 wt % of resin, and from 15 to 45 wt % of filler material, each wt % based on the total weight of the filled resin system. Typically, the rear reinforcement layer has from 100 to less than 250 gsm, for example 100 to 200 gsm of the mixture of resin and filler material.

In a preferred embodiment, the non-woven carbon fibres in the central multilayer portion 8 have a total fabric weight of from 350 to 1000 gsm. In addition, the fibres of the second fibrous layer in the reinforcement layer 10, and optionally in the central multilayer portion 8 and/or the front layer 4, have a total fabric weight of from 25 to 400 gsm. Also, the total resin content is from 600 to 1100 gsm.

Preferably, the total weight of the composite panel 2 is less than 1900 gsm, preferably less than 1800 gsm, optionally from 1600 to 1800 gsm. Preferably, the composite panel has a total thickness of from 0.5 to 1.5 mm, optionally from 0.7 to 1.3 mm for example from 1.00 to 1.25 mm.

Preferably, the central multilayer portion 8 is substantially symmetric on opposite sides of a plane extending centrally along the central multilayer portion 8. The fibrous material therein is composed only of carbon fibres, and the front layer 6 and the rear reinforcement layer 10 each comprise resin and a filler material, and the rear reinforcement layer 10 further comprises the second fibrous layer of the plurality of continuous fibres. Preferably, the front layer 6 has a higher weight per unit area of resin than the rear reinforcement layer 10. In one embodiment, the front layer 6 does not comprise any woven or non-woven fibres, and the second fibrous layer has a fibre weight of from 50 to 300 gsm of continuous fibres, typically which continuous fibres have a lower Young's modulus and higher strain, typically greater than 1.5%, than the carbon fibres of the central multilayer portion 8. This can provide a balanced structure resistant to warping, which exhibits impact strength.

The continuous fibres of the second fibrous layer preferably have a higher coefficient of thermal expansion than carbon fibres in the central multilayer portion 8, so that there is a lower difference between the coefficients of thermal expansion for the continuous fibres of the second fibrous layer and the resin of the second fibrous layer, which tends to reduce any print effect at elevated temperature from the woven fibres of the second fibrous layer.

Figure 7:
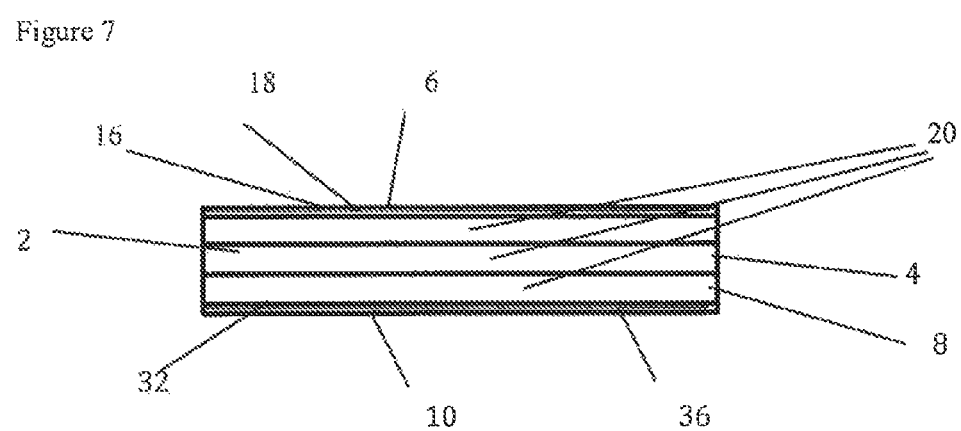
FIG. 7 schematically illustrates an enlarged cross-section through a part of a vehicle body panel according to a second embodiment of the present invention.

FIG. 7 schematically illustrates an enlarged cross-section through a part of a vehicle body panel 2 according to a further embodiment of the present invention. Referring to FIG. 7, in some embodiments of the present invention, the front layer 6 further comprises a fibrous layer 18 of a plurality of continuous fibres, preferably woven fibres. The continuous fibres of the fibrous layer 18 typically have a lower Young's modulus and higher strain, typically greater than 1.5%, than the non-woven carbon fibres of the first fibrous layer of the central multilayer portion 8. Therefore, the continuous fibres of the fibrous layer 18 typically have a greater strain, under an applied stress, than the discontinuous non-woven carbon fibres of the first fibrous layer 20.

The continuous fibres of the fibrous layer 18 are typically composed of glass fibres, thermoplastic fibres or aramid fibres, and are preferably glass fibres, for example E-glass fibres. Typically, the continuous fibres of the fibrous layer 18 have a fibre weight of from 25 to 300 gsm, or preferably 25 to 200 gsm, or more preferably 25 to 100 gsm. The continuous fibres may be in the form of a fabric, and the fabric may comprise a plain weave, twill weave, or satin weave (e.g. eight-harness-satin weave) of E-glass fibres.

In one embodiment, the front layer 6 further comprises a fibrous layer 18 of a plurality of continuous fibres, and the front layer and the rear reinforcement layer have the same composition. The front layer 6 and the rear reinforcement layer 10 each comprise from 100 to 350 gsm of a filled resin system comprising 55 to 85 wt % resin and 15 to 45 wt % filler material, each wt % based on the total weight of the filled resin system, and from 25 to 200 gsm, optionally from 25 to 100 gsm of the continuous fibres.

In one preferred embodiment, the front layer 6 has from 200 to 450 gsm of a filled resin system comprising 55 to 85 wt % resin and 15 to 45 wt % filler material, each wt % based on the total weight of the filled resin system, and the rear reinforcement layer has from 100 to 250 gsm of a filled resin system comprising 55 to 85 wt % resin and 15 to 45 wt % filler material, each wt % based on the total weight of the filled resin system, and from 50 to 200 gsm, optionally from 50 to 100 gsm, of continuous fibres in the second fibrous layer.

Typically, the front layer 6 comprises from 10 to 40 wt % of continuous fibres of the third fibrous layer 18, and from 60 to 90 wt % of a filled resin system, each wt % based on the total weight of the front layer, the filled resin system comprising from 55 to 85 wt % of resin, and from 15 to 45 wt % of filler material, each wt % based on the total weight of the filled resin system. For example, the front layer 6 comprises from 15 to 35 wt % of continuous fibres of the third fibrous layer, and from 65 to 85 wt % of a filled resin system, each wt % based on the total weight of the front layer, the filled resin system comprising from 55 to 85 wt % of resin, and from 15 to 45 wt % of filler material, each wt % based on the total weight of the filled resin system. Typically, the front layer 6 has from greater than 200 to up to 450 gsm of the mixture of resin and filler material.

Particular examples of the front layer surfacing film and the rear reinforcement layer are illustrated below in Table 1.

TABLE 1

|  | Material 1 | Material 2 | Material 3 | Material 4 | Material 5 | Material 6 |
|---|---|---|---|---|---|---|
| Filled Resin/gsm | 300 | 150 | 300 | 150 | 300 | 450 |
| Continuous (Woven) Glass Fibre gsm | 70 | 70 | 70 | 70 | 35 | 35 |
| % Filler in Filled Resin | 40% | 40% | 20% | 20% | 40% | 40% |
| Filler gsm | 120 | 60 | 60 | 30 | 120 | 180 |
| Epoxy resin gsm | 180 | 90 | 240 | 120 | 180 | 270 |
| Continuous Glass Fibre gsm | 70 | 70 | 70 | 70 | 35 | 35 |
| Total gsm for the layer | 370 | 220 | 370 | 220 | 335 | 485 |

The epoxy resin of materials 1 and 2, and 5 and 6, is an epoxy resin having a Tg after curing of 200° C. and the epoxy resin of materials 3 and 4 is an epoxy resin having a Tg after curing of 160° C. The selection of a particular Tg for the resin system may depend upon the processing temperature employed to produce a final product, for example a painting temperature for the manufacture of a vehicle body panel. The selection of a particular Tg for the final cured resin depends primarily upon the specific end-use application of the moulded product. Typically, the resin used in all of the layers of the panel has the same Tg.

In various embodiments the following surfacing film/rear reinforcement layer combinations are provided on opposite sides of the central multilayer laminate of carbon fibres to provide A- and B-surfaces as follows, although other combinations could also be provided:
Combination 1—A-surface=material 1 and B-surface=material 2
Combination 2—A-surface=material 1, but glass fibre omitted, and B-surface=material 2
Combination 3—A-surface=material 1 and B-surface=material 1
Combination 4—A-surface=material 1, but glass fibre omitted, and B-surface=material 1
Combination 5—A-surface=material 2 and B-surface=material 2
Combination 6—A-surface=material 2, but glass fibre omitted, and B-surface=material 2
Combination 7—A-surface=material 3 and B-surface=material 4
Combination 8—A-surface=material 3, but glass fibre omitted, and B-surface=material 4
Combination 9—A-surface=material 3 and B-surface=material 3
Combination 10—A-surface=material 3, but glass fibre omitted, and B-surface=material 3
Combination 11—A-surface=material 4 and B-surface=material 4
Combination 12—A-surface=material 4, but glass fibre omitted, and B-surface=material 4
Combination 13—A-surface=material 5 and B-surface=material 1 or 2
Combination 14—A-surface=material 6 and B-surface=material 1 or 2.

Any of these combinations includes a central multilayer portion which comprises at least one first fibrous layer, and optionally a pair of first fibrous layers with a continuous fibrous layer sandwiched therebetween, as described below.

Figure 8:
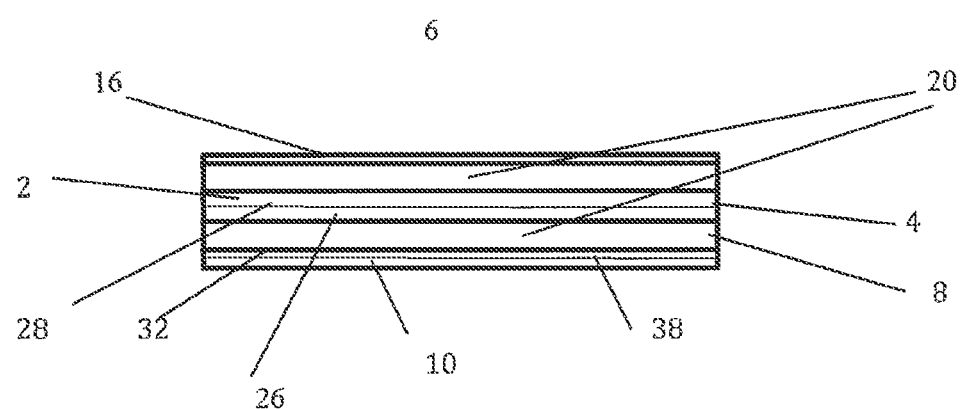
FIG. 8 schematically illustrates an enlarged cross-section through a part of a vehicle body panel according to a third embodiment of the present invention.

FIG. 8 schematically illustrates an enlarged cross-section through a part of a vehicle body panel 2 according to a further embodiment of the present invention. Referring to FIG. 8, in some embodiments, the central multilayer portion 8 further comprises at least one further ply 26 which includes a fibrous layer 28 of continuous carbon fibres, for example woven, UD or multiaxial carbon fibres. The fibrous layer 28 of continuous carbon fibres typically has a fibre weight of from 100 to 300 gsm, for example from 150 to 250 gsm. In one example, the central multilayer portion 8 comprises a pair of first fibrous layers 22 with the continuous fibrous layer 28 sandwiched therebetween.

In this embodiment, the carbon fibres in the central multilayer portion 8 comprise non-woven fibres with a fabric weight of from 300 to 450 gsm and continuous, for example woven, UD or multiaxial, fibres with a fabric weight of from 100 to 300 gsm. The non-woven carbon fibres in the central multilayer portion 8 are arranged substantially symmetrically on opposite sides of a central layer of the continuous carbon fibres in the central multilayer portion 8.

The further ply 26 is preferably centrally located at the neutral axis of the panel 2 so as to reduce any warping of the panel portion as a result of different thermal expansion of the layers. Any construction of further ply 26 may be employed which provides enhanced impact strength for the panel 2. The further ply 26 may optionally comprise a particulate filler material, the particulate filler material to impart further strength, toughness, and/or stiffness such as milled or chopped carbon fibre, wollastonite, impact modifiers, rubbers and thermoplastic particles. In a preferred embodiment the particulate filler comprises milled or chopped carbon fibre.

In the preferred embodiments of the composite panel of the present invention, a weight ratio between (i) continuous fibres in the reinforcement layer 10, and optionally in the central multilayer portion 8 and/or the front layer 6 (e.g. continuous aligned fibres that are typically woven or UD or multiaxial) and (ii) non-woven carbon fibres in the central multilayer portion 8 (i.e. discontinuous randomly oriented fibres), is from 0.05 to 1.05:1, typically from 0.11 to 0.9:1, for example from 0.23 to 0.85:1. Preferably therefore, there is a greater proportion (i.e. a majority, and greater than 50%), by weight, of discontinuous fibres than continuous fibre in the composite panel. The discontinuous fibres can contribute to the panel properties of low weight and a high quality front surface and the continuous fibres in the composite panel can provide enhanced impact resistance.

There is now described a method of manufacturing the composite panel of FIG. 2 which is composed of a fibre reinforced resin matrix composite material.

In the method, in a first step, a panel part is located in a moulding cavity of mould tool of a press mould. The mould tool has an upper mould element defining an upper moulding surface and a lower mould element defining a lower moulding surface. For a vehicle body panel 2, typically the lower moulding surface moulds and defines the A-surface of the resultant composite panel 2, although the alternative arrangement could be employed.

The panel part is comprised of a first multilayer laminate including a plurality of central plies. At least one of the central plies includes a first fibrous layer of a plurality of non-woven carbon fibres which are substantially randomly oriented. The first multilayer laminate is to form the central multilayer portion 8 of the panel 2. The panel part is further comprised of a reinforcement part, to form the rear reinforcement layer 10 of the panel 2, which is comprised of a rear ply which includes a second fibrous layer of a plurality of continuous fibres. The panel part further comprises a surface resin film to form the front layer 6 of the panel 2, the surface resin film including inorganic filler particles.

The panel part and the reinforcement part are provided with a resin, typically the same resin as the surface resin film.

In one embodiment the panel part and the reinforcement part comprise prepregs, incorporating a resin layer adjacent to or at least partly impregnating the central plies and rear ply. Depending on the part complexity, the prepreg layers may be first drape formed, typically using a matched tool set in a double diaphragm vacuum forming process. The prepreg layup is then subjected to compression moulding to form the moulded composite panel, as described below.

Alternatively, in another embodiment, the panel part and the reinforcement part comprise a preform coated with, or containing, one or several coatings of liquid resin between the fibrous layers. The preform has typically been made by stacking dry fibrous layers to form a laminate and then the laminate has been coated with a wet liquid resin. The liquid resin typically has a viscosity of from 5 to 1200 cP (centipoise), optionally 5 to 900 cP, at the resin coating temperature used. Thereafter the resin can optionally be B-staged (i.e. partly cured) to increase the rigidity of the preform prior to transfer to a mould tool for compression moulding to form the moulded product, as described below. Preferably, the B-staging step is carried out during the drape forming process and the preform removed from the drape forming apparatus once the B-staging is completed to give a more rigid low tack or dry impregnated or partially impregnated preform for easier handling and transfer to an optional cutting operation, further laminating operation, or simply placed in a holder ready to be loaded into the final mould tool. Alternatively, the laminate coated with a wet liquid resin can be transferred directly to a mould tool for compression moulding to form the moulded product, as described below.

In a further alternative embodiment, the panel part and the reinforcement part are formed by a gap impregnation resin transfer moulding (RTM) process. The assembly may comprise a layup of dry fibre layers. The assembly is located in the mould cavity of the mould tool and the mould tool is not fully closed to provide a gap above the assembly in the mould cavity. Then liquid resin is injected into the mould cavity, via an injection line from a remote supply of resin, so as to commence impregnation of the fibre layers in a resin transfer moulding (RTM) process. The liquid resin typically has a viscosity of from 5 to 1200 cP (centipoise), optionally from 5 to 900 cP, at the injection temperature used. The assembly is not fully compressed during the injection so that the resin has a high degree of infusion into the fibrous layers, which have a high permeability as a result of the loft of the uncompressed fibrous layers. The injection is then terminated after a desired measured dose of resin has been injected into the mould cavity, and a valve on the injection line is closed. The press mould is then fully closed to complete the impregnation and compaction of the fibrous layers to the desired volume fraction in each region.

In the preferred embodiment, the assembly may comprise a prepreg layup, optionally preshaped as a preform, in which fibre layers and resin have been combined and the resin at least partially impregnates the fibre layers. Optionally, the preform is consolidated and the thermosetting resin has been B-staged so that the preform comprises a more rigid prepreg. Although initial prepreg material from a preformed roll may be employed to form the prepreg layup, alternatively the rigid prepreg may preferably be formed by a wet resin process and subsequent B-staging which is a low cost manufacturing process. The B-staging of the liquid resin effectively turns the liquid coated preform into a partially or fully impregnated prepreg preform depending on the pressure applied. The preform has an advantage of greater rigidity than dry fibre layers. The assembly may be assembled off line, optionally in a preform mould, and then located in the mould, or the assembly may be assembled in the mould. The assembly is typically loaded into the mould cavity such that the surface to form the A-surface, and in particular a surface film when present, is located toward a moulding surface of the mould, typically the lower mould part.

In a subsequent press moulding step, the assembly in the mould tool is press moulded to cause the resin to impregnate fibrous layers of the assembly and form a composite panel 2 composed of a fibre reinforced resin matrix composite material. As shown in FIGS. 1 and 2, in the composite panel 2, a rear reinforcement layer 10, formed from the reinforcement part and the front layer 6, formed from the surface resin film, are integrally moulded with the central multilayer portion 8, formed from the panel part, to provide one or more primary structural regions 10 of the composite panel 2.

The moulding step may be conducted at a net equivalent pressure of from 10 to 80 bar, typically from 20-50 bar, this being the pressure applied to the mould tool by the moulding press. The moulding step may optionally be conducted at a temperature of from 80-250° C., typically at a temperature of from 120-220° C.

The preform may be formed by subjecting an assembly of fibrous layers and resin, optionally in the form of prepreg layers, to a temperature of from 0 to 150° C. and/or a preform moulding pressure of from 0.01 to 80 bar or more preferably 0.9 to 50 bar to form the preform in a preform mould.

The preform may be subsequently cooled prior to insertion into the mould cavity to make the preform more rigid.

The preform may be partially or fully impregnated prior to loading into the mould tool. An advantage of providing a preform prior to the moulding step described hereinbelow instead of laying a prepreg directly into the mould is that the preform can be shaped, and optionally trimmed, to the correct size and form is more rigid, can be easily handled into the tool. The draping steps to form the preform can be done at a more controlled rate and viscosity of the resin rather than at the final cure temperature where the resin would quickly gel and cure. Thus, the correct resin and fibre ratio and shape can be prepared off-line from the main tool and faster overall cycle times achieved.

During the moulding step, a vacuum is applied to the cavity of the mould and then a closure load is applied to the mould to generate a pressure in the cavity of the mould. This causes at least a portion of the thermosetting resin to infuse, i.e. migrate, into the fibrous layer to fully or partially impregnate the carbon fibres. Typically, the carbon fibres are fully impregnated by the thermosetting resin.

The press mould applies a closure force to the mould tool, the closure force optionally being less than 25,000 kiloNewtons, further optionally less than 10,000 kiloNewtons. The press mould therefore applies a closure pressure across a moulding area of the mould tool. Typically, the press mould applies a pressure within the range of from 2 to 80 bar, optionally from 2 to 50 bar, across a moulding area of the mould tool.

A net pressure is applied to the mould tool. The net pressure is the force applied to the mould tool by the press mould divided by the moulding area of the assembly being press moulded, the moulding area being projected onto a central plane of the mould tool which is orthogonal to the press moulding direction. Typically, the net pressure is within the range of from 2 to 80 bar, optionally from 2 to 50 bar, across the moulding area. This can generate localised compressive pressures of from 10 to 100 bar, optionally from 20 to 50 bar, within the moulding area.

The panel part includes at least one ply which comprises a fibrous layer of a plurality of non-woven carbon fibres which are substantially randomly oriented. Such a layer is selected to have loft, which provides that the layer is compressible.

The random fibrous layer typically has a loft such that the fibrous layer is compressed in thickness by at least 30%, typically at least 45%, more typically at least 50% of the uncompressed thickness when subjected to a compressive load of 1 bar at 18-23° C.

The fibrous layer comprises a plurality of non-woven carbon fibres, which are substantially randomly orientated. The fibrous layer has interstices between the carbon fibres dimensioned for absorbing at least a portion of the thermosetting resin during a resin infusion step.

The carbon fibres may be recycled carbon fibres (recycled fibre sources), for example from commercial carbon fibre and carbon fibre fabric suppliers such as ELG Carbon Fibre Ltd, SGL Group, Saertex and Formax. The advantage of recycled carbon fibres is that the cost and carbon footprint of the method used to manufacture the fibrous layer is reduced. The fibrous layer may be formed as a batt, optionally where the batt is formed of single or multiple fibre layers.

The fibrous layer may be manufactured by a carding process. Following the carding process, a multiply-layered substantially randomly oriented fibre matt may be formed by a needling process to entangle the fibrous layers and enable it to be subsequently wound and handled in a roll format. Thus, the fibrous layer may comprise sub-layers, the sub-layers being optionally interconnected by needling. Stitching of the matt induces print marks into the final surface and a greater surface resin layer is needed to mask the stitching marks and is not preferred. The fibrous layer may therefore optionally comprise needle holes, which are formed during the needling.

Alternatively the fibrous layer may be formed by first dispersing the fibres in an aqueous binder solution, forming and drying a web of multiply-layered substantially randomly oriented fibres and optionally compressing to assist the binder locally adhering the fibres to form a stable matt of fibrous layers each comprising substantially randomly oriented fibres, in particular carbon fibres.

The thickness of the initial fibrous layer, when not subjected to any compressive load, and prior to incorporation into any preform, may be from 500 microns to 10 mm, preferably from 2 to 10 mm, typically from 3 to 8 mm.

Three examples of fibrous layers comprising a plurality of non-woven carbon fibres which are substantially randomly orientated are set out below in Table 2. Table 2 lists a description of each material, together with its thickness (in mm) when not under a compressive load, the thickness (in mm) when under a compressive load of 1 bar at 23° C., a ratio (%) between the compressed thickness and the uncompressed thickness, and a compaction ratio (%) between the uncompressed thickness and the compressed thickness.

In Table 2, the compaction of the fibrous layer was measured using a Zwick Mechanical Testing machine. Three plies of 100×100 mm dry fibrous material were compressed between two 80 mm cylinders. The vertical displacement was first zeroed by closing the cylinders with no material present. The cylinders were then opened and the material placed between. The cylinders were then closed and the point of first contact noted. Further force was applied to measure the thickness of the material stack vs. the applied pressure. The average ply thickness from 5 different test specimens was used.

TABLE 2

| Material | Description | Initial Thickness (mm) | Thickness @ 1 bar (mm) | % of starting thickness | % Compaction |
|---|---|---|---|---|---|
| A | Non-woven needled multi-layered carbon. Mixed fibre 10-150 mm, 211 gsm | 4.1 | 0.75 | 43% | 57% |
| B | Non-woven needled multi-layered carbon Mixed fibre 10-150 mm, 196 gsm | 4.0 | 0.74 | 19% | 81% |
| C | Non-woven needled multi-layered carbon. Chopped fibre 25 mm, 245 gsm | 6.0 | 1.15 | 19% | 81% |

The panel region can have relatively low fibre volume fraction $V_f$, to provide easy moulding of the visible cosmetic surface in combination with small panel thickness to reduce panel weight. Since the lower $V_f$ is achieved by a lower compressive moulding pressure, the panel region is less compressed and therefore any inadvertently formed resin rich areas from a low areal weight of fibre in the small thickness panel region are not as significantly different to the neighbouring material and can readily be accommodated within the panel region without providing a visible discontinuity. This means that the surface can qualify as an A-surface body panel for a vehicle.

In addition, the surface film is present containing a filler, and resin in the surface film may infuse into the fibrous layer, and, at the same time, at least a portion of the filler is filtered in the surface film to remain in the surface film. Thus, during the moulding step, at least a portion of thermosetting resin infuses into the fibrous material from the surface film, resulting in full or partial impregnation of the carbon fibres and this concentrates the filler content remaining at the surface. This assists the surface qualifying as an A-surface body panel for a vehicle.

The fibrous layers may comprise needle holes. A needling process for random oriented carbon fibres players provides stabilisation but usually induces resin rich zones in cured parts, and in particular resin rich zones can also form at the fibre crossovers on the part surface. The use of a surface film comprising filler can even further reduce any potential problems with needle holes. When such needle holes are present, the needle holes are at least partially filled with the filler material, originating from the surface film, during the moulding step. The filler can improve the surface quality since the filled needle holes would have a reduced tendency to read through into the final painted surface.

As the fibrous layer has high loft it absorbs a significant volume of the thermosetting resin during the moulding step. The fibrous layer acts as an effective filter to concentrate the filler particles within the thermosetting resin to form a high solids consistent resin layer between the fibrous layer and the A-Surface. By providing the embodiment of the present invention with a surface layer comprising a thermosetting resin and filler, it is possible to achieve an A-class finish at low areal weights.

The present invention is illustrated further with reference to the following non-limiting Examples.

Example 1

A sample composite panel structured to form an automobile body panel was manufactured according to the present invention. The panel comprised a composite panel composed of a fibre reinforced resin matrix composite material. The inner panel was designed to function as stiffener to an outer hood exhibiting an A-surface front face.

A surfacing film was provided. The surfacing film comprised an epoxy resin, having a Tg of 160° C. after curing, and talc filler particles dispersed therein. The filled epoxy resin impregnated a woven fabric comprising 70 gsm E-glass plain weave fabric, which comprised continuous fibres. The surfacing film had a total areal weight of 370 gsm in a ratio of 70 gsm continuous glass fibre, 180 gsm epoxy resin and 120 gsm talc filler particles. Therefore, the resin system of filled epoxy resin comprised 60 wt % epoxy resin and 40 wt % filler particles. The continuous fibres comprised about 19 wt % of the surfacing film.

A rear reinforcement layer was provided. The rear reinforcement layer comprised an epoxy resin, having a Tg of 160° C. after curing, and with talc filler particles dispersed therein. The filled epoxy resin impregnated a woven fabric comprising 70 gsm E-glass plain weave fabric, which comprised continuous fibres. The rear reinforcement layer had a total areal weight of 220 gsm in a ratio of 70 gsm continuous glass fibre, 90 gsm epoxy resin and 60 gsm talc filler particles. Therefore, the resin system of filled epoxy resin comprised 60 wt % epoxy resin and 40 wt % filler particles. The continuous fibres comprised about 31 wt % of the rear reinforcement layer.

A roll of prepreg material was provided. The prepreg material comprised a fibrous layer of a plurality of non-woven substantially randomly oriented, discontinuous, carbon fibres impregnated with an epoxy resin, with a weight ratio of 50 wt % carbon fibres and 50 wt % epoxy resin. The fibrous layer has a nominal carbon fibre areal weight of 200 grams per square metre. The fibre areal weight of the roll had a tolerance of +/−8 wt %.

A multilayer assembly was laid up on a sheeting table which was cut to form the required two-dimensional shape and dimensions. The multilayer assembly comprised a lower layer of the surfacing film, three plies of the prepreg material and an upper layer of the rear reinforcement layer to provide a five layer laminate. The laminate was provided between opposed outer layers of release film. Optionally the laminate may be clamped at its edges to prevent creasing of the prepreg layers. The multilayer laminate was then heated to soften the resin, and the heated laminate was then draped (in ambient temperature, i.e. at 20° C.) under the action of gravity into mould tool to form a preform. This preform was shaped to provide a preliminary shaping of the final panel. The cold mould caused the preform to be cooled which provided some rigidity to the moulded shape of the preform. The shaped preform may be subjected to an optional trimming process around its periphery, and may be heated or cooled prior to trimming.

Thereafter, the multilayer preform may be subjected to B-staging, by the application of heat and optionally pressure, to partly cure the resin and further rigidify the multilayer preform. Additionally or alternatively, the multilayer preform may be chilled prior to the subsequent steps.

In the press moulding step, the preform was located in a moulding cavity of a mould tool of a press mould. Then the preform was press moulded in the mould tool to cause the resin to impregnate fibrous layers of the assembly and form a composite panel composed of a fibre reinforced resin matrix composite material.

The properties of the resultant composite panel are shown in Table 2. The five ply composite panel had a thickness of 1.2 mm. The total areal weight was 1790 gsm, comprising the proportions 600 gsm of discontinuous fibre (i.e. 3 central plies of 200 gsm non-woven substantially randomly oriented carbon fibres), 140 gsm of continuous fibre (i.e. front and rear plies of 70 gsm woven glass fibres) and 1050 gsm resin. This provided a weight ratio between the continuous fibre and the discontinuous fibre of 0.23.

When subjected to a vertical drop weight impact strength test, in which a weight within a tube was dropped from a controlled height onto a steel mass with a 16 mm diameter ball end already resting on the panel surface. The height of the weight was set to give a kinetic energy on impact of 3 Joules to simulate typical localised impacts, for example workshop tools dropped onto the body panel during maintenance operations or by stones thrown up from a road surface, against an automobile body panel. The impact dent was measured as the depth from the original surface at 2.8 mm.

The paintability of the front surface was determined on a scale of 1 to 10. Composite panels are difficult to paint. The fibre and resin structure can show through to the final paint surface as the resin and fibres expand differently when subject to heat and moisture causing texture to become visible. This can happen after the cure cycle, during the paint bake process, or later when exposed to different environmental conditions. Epoxy resins can also be abrasive resistant, especially as the cross link density increases to improve the thermal stability of the panel making the panels difficult to sand to prepare for painting. If the sanding process exposes fibres at the surface, these fibres can also cause surface defects in the paint. The use of a surface layer can make it easier to prepare a panel for paint by making the surface both softer to sand and providing a buffer layer containing no fibrous material. Panels were given a rating of 1 to 10 on the ease to prepare for painting and avoid these typical defects. A rating of 10 would be a panel free of defects and easy to prepare for paint and 1 would be a panel difficult to prepare and would form later paint defects. The paintability of the front surface was a value of 7.

The warping of the panel when subjected to thermal stresses was determined. All panels were cured as 250×270 mm flat panels at 160° C. After de-moulding, the panel was allowed to cool to room temperature (20° C.) and the panel was placed onto a flat surface to check for distortion. If the panel was not thermally balanced one or more corners would be raised. To measure the level of distortion, three corners were held against the surface while measuring the distance of the highest corner from the reference flat surface. There was no measurable warping of this panel as the height was measured at 0 mm.

Example 2

A sample composite panel structured to form an automobile body panel was manufactured according to the present invention. The panel comprised a composite panel similar to that of Example 1, namely a five ply panel with a surfacing film front layer, three plies of non-woven substantially randomly oriented carbon fibres impregnated with an epoxy resin, and a rear reinforcing layer of filled epoxy resin impregnating woven 70 gsm E-glass plain weave fabric, except that the front layer comprised a surfacing film of an epoxy resin having talc filler particles dispersed therein in which the woven 70 gsm E-glass plain weave fabric was omitted.

The surfacing film comprised an epoxy resin, having a Tg of 160° C. after curing, and talc filler particles dispersed therein. The surfacing film had a total areal weight of 300 gsm in a ratio of 180 gsm epoxy resin and 120 gsm talc filler particles. Therefore, the resin system of filled epoxy resin comprised 60 wt % epoxy resin and 40 wt % filler particles. The rear reinforcement layer was the same as in Example 1.

TABLE 3

|  | Panel Thickness | Resin Content (gsm) | Cont. Fibre (gsm) | Discont. Fibre (gsm) | Total Wt (gsm) | Impact Dent (3 J) | Paint | Warp (mm) | Weight Ratio Cont./Discont. Fibre |
|---|---|---|---|---|---|---|---|---|---|
| Comp. Ex. 1 | 1.91 | 1703 | 695 | 0 | 2398 | 0.1 | 6 | 0 | — |
| Comp. Ex. 2 | 1.15 | 690 | 1170 | 0 | 1860 | 0.1 | 5 | 1 | — |
| Comp. Ex. 3 | 1.15 | 1200 | 0 | 600 | 1800 | 10.0 | 10 | 0 | 0.00 |
| Comp. Ex. 4 | 1.20 | 823 | 980 | 0 | 1803 | 0.4 | 1 | 2 | — |
| Ex. 1 | 1.20 | 1050 | 140 | 600 | 1790 | 2.8 | 7 | 0 | 0.23 |
| Ex. 2 | 1.10 | 1050 | 70 | 600 | 1720 | 6.2 | 9 | 1 | 0.12 |
| Ex. 3 | 1.14 | 1034 | 340 | 400 | 1774 | 0.7 | 6 | 0 | 0.85 |

The properties of the resultant composite panel are shown in Table 3. The five ply composite panel had a thickness of 1.1 mm. The total areal weight was 1720 gsm, comprising the proportions 600 gsm of discontinuous fibre (i.e. 3 central plies of 200 gsm non-woven substantially randomly oriented carbon fibres), 70 gsm of continuous fibre (i.e. a rear ply of 70 gsm woven glass fibres) and 1050 gsm resin. This provided a weight ratio between the continuous fibre and the discontinuous fibre of 0.12.

When subjected to the impact strength test, the impact dent was measured as 6.2 mm. This is lower than Example 1 as a result of the omission of the woven glass fabric in the front surfacing film, but is acceptable in some applications.

The paintability of the front surface was very high, at a value of 9.

The warping of the panel was low, namely 1 mm.

Example 3

A sample composite panel structured to form an automobile body panel was manufactured according to the present invention. The panel comprised a composite panel similar to that of Example 1, but an additional woven carbon fibre fabric, i.e. continuous fibres, was sandwiched between two plies of non-woven substantially randomly oriented carbon fibres, i.e. discontinuous fibres. The composite panel comprised a five ply panel with a surfacing film front layer filled epoxy resin impregnating woven 70 gsm E-glass plain weave fabric, a ply of non-woven substantially randomly oriented carbon fibres impregnated with an epoxy resin, a 200 gsm carbon twill fabric impregnated with an epoxy resin, a further ply of non-woven substantially randomly oriented carbon fibres impregnated with an epoxy resin, and a rear reinforcing layer of filled epoxy resin impregnating woven 70 gsm E-glass plain weave fabric.

The properties of the resultant composite panel are shown in Table 3. The five ply composite panel had a thickness of 1.14 mm. The total areal weight was 1774 gsm, comprising the proportions 400 gsm of discontinuous fibre (i.e. 2 central plies of 200 gsm non-woven substantially randomly oriented carbon fibres), 340 gsm of continuous fibre (i.e. front and rear plies of 70 gsm woven glass fibres and a central ply of 200 gsm woven carbon fibres) and 1034 gsm epoxy resin. This provided a weight ratio between the continuous fibre and the discontinuous fibre of 0.85.

When subjected to the impact strength test, the impact dent was measured as 0.7 mm, which is a high impact strength. This is higher than Example 1 as a result of the addition of the woven carbon fabric in the central laminate.

The paintability of the front surface was comparable to Example 1, at a value of 6.

The warping of the panel was very low, namely 0 mm.

Comparative Example 1

The composite panel of Comparative Example 1 comprised a panel structure manufactured and sold by Gurit (UK) Limited under the trade name CBS, which stands for "Car Body Sheet". The CBS panel comprises an epoxy surfacing film on a sandwich of opposed woven carbon fibre/epoxy layers with a central core layer of epoxy syntactic foam. There is no discontinuous fibre. This panel structure has been successfully and widely used commercially for a variety of high performance sports cars. The properties of the test panel of Comparative Example 1 are shown in Table 3. It may be seen that the panel had a greater thickness (1.91 mm) and a greater areal weight (2398 gsm) than the panel of Example 1. The test panel of Comparative Example 1 had good impact properties (an impact dent value of only 0.1 mm) and paintability and warp similar to Example 1.

Therefore, as compared to the known commercial composite panel of Comparative Example 1, Example 1 can provide a composite panel with similar A-surface and warp resistance properties, with acceptable impact resistance and at much lower areal weight. Example 1 provides a composite panel with high quality aesthetic and structural properties, and at an acceptable low production cost, for use as vehicle body panel at much lower areal weight than known commercial panels.

Comparative Example 2

The composite panel of Comparative Example 2 comprised a panel structure which is also manufactured and sold commercially for vehicle body panels which comprises a cross-ply unidirectional (UD) carbon fibre/epoxy composite material. There is no discontinuous fibre. This panel structure has also been widely used commercially for a variety of high performance sports cars. The properties of the test panel of Comparative Example 2 are shown in Table 3. It may be seen that the panel had a higher areal weight (1860 gsm) than the panel of Example 1. The test panel of Comparative Example 2 had good impact properties (an impact dent value of only 0.1 mm) and paintability and warp similar to Example 1.

Therefore, as compared to the known commercial composite panel of Comparative Example 2, Example 1 can provide a composite panel with similar A-surface and warp resistance properties, with acceptable impact resistance and at lower areal weight. Example 1 provides a composite panel with high quality aesthetic and structural properties, and at an acceptable low production cost, for use as vehicle body panel at much lower areal weight than known commercial panels.

Comparative Example 3

The composite panel of Comparative Example 3 comprised a panel structure which comprised three plies of the prepreg material used in Example 1. There is only discontinuous fibre. The properties of the test panel of Comparative Example 3 are shown in Table 3. It may be seen that the panel had a comparable areal weight to than the panel of Example 1 and very good paintability and warp. However, the test panel of Comparative Example 3 had poor impact properties (an impact dent value of 10.0 mm).

Therefore, as compared to the composite panel of Comparative Example 3, Example 1 can provide a composite panel with acceptable A-surface and warp resistance properties, with significantly increased impact resistance and at comparable areal weight, which has high quality aesthetic and structural properties, and at an acceptable low production cost, for use as vehicle body panel.

Comparative Example 4

The composite panel of Comparative Example 4 comprised a panel structure which comprised four plies of a 245 gsm carbon fibre twill. There is only continuous fibre. The properties of the test panel of Comparative Example 4 are shown in Table 3. It may be seen that the panel had a comparable areal weight to than the panel of Example 1 and good impact properties and warp, but very poor paintability.

In summary, in preferred embodiments of the present invention the final weight of a given carbon fibre panel can be reduced without compromising impact resistance, and the panel can be produced reliably and at low cost to achieve a high quality press moulded part.

Various other embodiments of the composite panel will be readily apparent to those skilled in the art.

What is claimed is:

1. A composite panel composed of a fibre reinforced resin matrix composite material, wherein the composite panel comprises:
   a multilayer laminate including:
   a front layer comprising a resin and a filler material having a lower coefficient of thermal expansion than the resin of the front layer;
   a central multilayer portion comprising a plurality of central plies of fibre reinforced resin matrix composite material, wherein at least one of the central plies includes a first fibrous layer of a plurality of non-woven carbon fibres which are substantially randomly oriented, wherein the front layer is adjacent to the first fibrous layer; and
   a rear reinforcement layer which is integrally moulded with the central multilayer portion and is located at a rear surface, opposite to the front layer, of the multilayer laminate, the reinforcement layer being comprised of a rear ply of fibre reinforced resin matrix composite material, wherein the rear ply includes a second fibrous layer of a plurality of continuous fibres which extend continuously from at least one portion of a first edge of the rear ply to at least one portion of an opposite second edge of the rear ply.

2. The composite panel according to claim 1, wherein the ends of the continuous fibres are located at edges of the second fibrous layer.

3. The composite panel according to claim 1, wherein the continuous fibres are mutually aligned and form an ordered configuration.

4. The composite panel according to claim 3, wherein the continuous fibres extend in at least one linear direction.

5. The composite panel according to claim 1, wherein the continuous fibres are in aligned bundles and the tows are aligned in a fabric that is a woven fabric or a uniaxial, biaxial, triaxial or other multiaxial fabric.

6. The composite panel according to claim 1, wherein the fibres of the second fibrous layer have a lower Young's modulus and higher strain than the non-woven carbon fibres of the first fibrous layer.

7. The composite panel according to claim 1, wherein the fibres of the second fibrous layer have a have a strain of greater than 1.5%.

8. The composite panel according to claim 1, wherein the fibres of the second fibrous layer are composed of glass fibres, thermoplastic fibres or aramid fibres.

9. The composite panel according to claim 8, wherein the fibres of the second fibrous layer are composed of glass fibres, or E-glass fibres.

10. The composite panel according to claim 1, wherein the second fibrous layer is a woven fabric with a plain, twill or satin weave.

11. The composite panel according to claim 1, wherein the fibres of the second fibrous layer have a weight of from 50 to 300 gsm.

12. The composite panel according to claim 11, wherein the fibres of the second fibrous layer have a weight of from 50 to 200 gsm, or from 50 to 100 gsm.

13. The composite panel according to claim 1, wherein the rear ply further comprises a filler material having a lower coefficient of thermal expansion than resin in the rear ply of fibre reinforced resin matrix composite material.

14. The composite panel according to claim 13, wherein the rear ply comprises from 10 to 40 wt % of continuous fibres, and from 60 to 90 wt % of a filled resin system, each wt % based on the total weight of the rear ply, the filled resin system comprising from 55 to 85 wt % of resin, and from 15 to 45 wt % of filler material, each wt % based on the total weight of the filled resin system.

15. The composite panel according to claim 14, wherein the rear ply comprises from 15 to 35 wt % of continuous fibres, and from 65 to 85 wt % of a filled resin system, each wt % based on the total weight of the rear ply, the filled resin system comprising from 55 to 85 wt % of resin, and from 15 to 45 wt % of filler material, each wt % based on the total weight of the filled resin system.

16. The composite panel according to claim 1, wherein the filler material comprises inorganic filler particles, milled carbon fibres or milled glass fibres, or any combination of any two or more thereof.

17. The composite panel according to claim 16, wherein the inorganic filler particles are selected from talc, calcium carbonate, silica, alumino-silicate ash, chalk, clay minerals, marble dust, slate powder and silicon carbide, or any combination of any two or more thereof.

18. The composite panel according to claim 16, wherein the filler material has an average particle size of from 5 to 100 microns, or from 8 to 30 microns.

19. The composite panel according to claim 1, wherein the front layer has a total weight of filled resin from 150 to 450 gsm, or from 150 to 350 gsm, or from 200 to 300 gsm.

20. The composite panel according to claim 1, wherein the front layer comprises from 55 to 85 wt % of resin and from 15 to 45 wt % of filler material, each wt % based on the total weight of the front layer.

21. The composite panel according to claim 1, wherein the front layer further comprises a third fibrous layer of a plurality of fibres continuous fibres which extend continuously from at least one portion of a first edge of the front layer to at least one portion of an opposite second edge of the front layer.

22. The composite panel according to claim 21, wherein the third fibrous layer has any one or more, in any combination, of the following features: (i) the ends of the continuous fibres of the third fibrous layer are located at edges of the second fibrous layer; (ii) the continuous fibres of the third fibrous layer are mutually aligned and form an ordered configuration; (iii) the continuous fibres of the third fibrous layer extend in at least one linear direction; (iv) the continuous fibres of the third fibrous layer are in aligned bundles and the tows are aligned in a fabric that is a woven fabric or a uniaxial, biaxial, triaxial or other multiaxial fabric; (v) the continuous fibres of the third fibrous layer have a lower Young's modulus and higher strain than the non-woven carbon fibres of the first fibrous layer; (vi) the fibres of the third fibrous layer have a strain of greater than 1.5%; (vii) the fibres of the third fibrous layer are composed of glass fibres, thermoplastic fibres or aramid fibres; (viii) the fibres of the third fibrous layer are composed of glass fibres, or E-glass fibres; (ix) the third fibrous layer is a woven fabric with a plain, twill or satin weave; (x) the fibres of the third fibrous layer have a weight of from 25 to 300 gsm, or from 25 to 200 gsm, or from 25 to 100 gsm; (xi) the fibres of the third fibrous layer are composed of a plain, twill or satin weave of E-glass fibres; and/or (xii) the continuous fibres of the third fibrous layer have a higher coefficient of thermal expansion than the carbon fibres in the central multilayer portion.

23. The composite panel according to claim 21, wherein the front layer comprises from 10 to 40 wt % of continuous fibres of the third fibrous layer, and from 60 to 90 wt % of a filled resin system, each wt % based on the total weight of the front layer, the filled resin system comprising from 55 to 85 wt % of resin, and from 15 to 45 wt % of filler material, each wt % based on the total weight of the filled resin system.

24. The composite panel according to claim 23, wherein the front layer comprises from 15 to 35 wt % of continuous fibres of the third fibrous layer, and from 65 to 85 wt % of a filled resin system, each wt % based on the total weight of the front layer, the filled resin system comprising from 55 to 85 wt % of resin, and from 15 to 45 wt % of filler material, each wt % based on the total weight of the filled resin system.

25. The composite panel according to claim 1, wherein the non-woven carbon fibres are discontinuous fibres which do not extend continuously from a first edge of the central ply to an opposite second edge of the central ply.

26. The composite panel according to claim 1, wherein the non-woven carbon fibres are not mutually aligned, form a disordered configuration, and do not extend in a common direction but are randomly arranged.

27. The composite panel according to claim 1, wherein the central multilayer portion comprises from 350 to 1000 gsm, or from 350 to 650 gsm, or from 350 to 450 gsm, of non-woven carbon fibres which are substantially randomly oriented.

28. The composite panel according to claim 1, wherein the central multilayer portion further comprises at least one intermediate ply which includes a fourth fibrous layer of woven carbon fibres and, wherein the fourth fibrous layer of woven carbon fibres has a fabric weight of from 100 to 300 gsm, or from 150 to 250 gsm.

29. The composite panel according to claim 28, wherein the central multilayer portion comprises a pair of second fibrous layers with the fourth fibrous layer sandwiched therebetween.

30. The composite panel according to claim 1, wherein (i) non-woven carbon fibres in the central multilayer portion have a total fabric weight of from 350 to 1000 gsm, (ii) continuous fibres in the second fibrous layer of the reinforcement layer, and optionally in the central multilayer portion and/or the third fibrous layer of the front layer, have a total fabric weight of from 50 to 400 gsm, and (iii) the total resin content is from 600 to 1100 gsm, and wherein the total weight of the composite panel is less than 1800 gsm or from 1600 to 1800 gsm.

31. The composite panel according to claim 1, wherein a weight ratio between (i) continuous fibres in the second fibrous layer of the reinforcement layer, and optionally in the central multilayer portion and/or the third fibrous layer of the front layer and (ii) non-woven carbon fibres in the central multilayer portion, is from 0.05 to 1.05:1, or from 0.11 to 0.9:1, or from 0.23 to 0.85:1.

32. The composite panel according to claim 1, wherein the composite panel has a total thickness of from 1.00 to 1.25 mm.

33. The composite panel according to claim 1, wherein the central multilayer portion is substantially symmetric on opposite sides of a plane extending centrally along the central multilayer portion and the fibrous material therein is composed only of carbon fibres, and the front layer and the rear reinforcement layer each comprise resin and a the filler material, the rear reinforcement layer further comprising the second fibrous layer of the plurality of continuous fibres and wherein the front layer has a higher weight per unit area of resin than the rear reinforcement layer or a higher weight per unit area of the filler material than the rear reinforcement layer, the front layer does not comprise any fibrous layer, and the second fibrous layer has a weight of from 50 to 300 gsm of continuous fibres.

34. The composite panel according to claim 33, wherein the front layer has from 200 to 450 gsm, or from greater than 250 to up to 450 gsm, of a filled resin system comprising 55 to 85 wt % resin and 15 to 45 wt % filler material, each wt % based on the total weight of the filled resin system, and the rear reinforcement layer has from 100 to 250 gsm of a filled resin system comprising 55 to 85 wt % resin and 15 to 45 wt % filler material, each wt % based on the total weight of the filled resin system, and from 50 to 200 gsm, or from 50 to 100 gsm, of continuous fibres in the second fibrous layer.

35. The composite panel according to claim 1, wherein the front layer further comprises a fibrous layer of a plurality of continuous fibres, and the front layer and the rear reinforcement layer have the same composition, wherein the front layer and the rear reinforcement layer each comprise from 100 to 350 gsm of a filled resin system comprising 55 to 85 wt % resin and 15 to 45 wt % filler material, each wt % based on the total weight of the filled resin system, and from 25 to 200 gsm, or from 25 to 100 gsm, of the continuous fibres.

36. The composite panel according to claim 35, wherein the carbon fibres in the central multilayer portion consist of non-woven fibres with a fabric weight of from 300 to 650 gsm, or wherein the carbon fibres in the central multilayer portion comprise non-woven carbon fibres with a fabric weight of from 300 to 450 gsm and continuous carbon fibres with a fabric weight of from 100 to 300 gsm.

37. The composite panel according to claim 36, wherein the non-woven carbon fibres in the central multilayer portion are arranged substantially symmetrically on opposite sides of a central layer of the woven carbon fibres in the central multilayer portion.

38. The composite panel according to claim 1, wherein the continuous fibres of the second fibrous layer have a higher coefficient of thermal expansion than the carbon fibres in the central multilayer portion.

39. The composite panel according to claim 1, wherein the front layer has a front surface which defines a front surface of the composite panel.

40. The composite panel according claim 1, wherein the composite panel is a vehicle body panel.

* * * * *

UNITED STATES PATENT AND TRADEMARK OFFICE
CERTIFICATE OF CORRECTION

PATENT NO. : 10,632,716 B2
APPLICATION NO. : 15/830297
DATED : April 28, 2020
INVENTOR(S) : Francis et al.

It is certified that error appears in the above-identified patent and that said Letters Patent is hereby corrected as shown below:

In the Claims

In Column 21, Line 16 (Claim 5, Line 2) delete "tows" and replace therewith --aligned bundles--

In Column 21, Line 24 (Claim 7, Line 2) delete the second instance of "have a"

In Column 22, Line 13 (Claim 21, Line 3) delete first instance of "fibres"

In Column 22, Line 26 (Claim 22, Line 10) delete "tows" and replace therewith --aligned bundles--

In Column 22, Line 61 (Claim 25, Line 2) after "carbon fibres" insert --of the at least one of the central plies--

In Column 22, Lines 62-63 (Claim 25, Lines 3-4) delete "the central ply" and replace therewith --the at least one of the central plies--

In Column 23, Line 39 (Claim 33, Line 4) delete "the"

In Column 23, Line 41 (Claim 33, Line 6) delete "a the"

Signed and Sealed this
Ninth Day of June, 2020

Andrei Iancu
*Director of the United States Patent and Trademark Office*